United States Patent

Honeycutt

[15] 3,641,880
[45] Feb. 15, 1972

[54] HYDRAULIC LOCK ROD EYE ASSEMBLY

[72] Inventor: Don R. Honeycutt, Bryan, Tex.
[73] Assignee: Omark Industries, Inc., Portland, Oreg.
[22] Filed: Jan. 5, 1970
[21] Appl. No.: 557

[52] U.S. Cl................................91/420, 91/468, 137/596.18, 137/596.2, 137/625.66
[51] Int. Cl..................................F15b 11/08, F15b 13/042
[58] Field of Search.........................91/420, 446, 447, 468; 137/100, 102, 625.66, 625.68, 596.18, 596.2

[56] References Cited

UNITED STATES PATENTS

| | | | |
|---|---|---|---|
| 2,401,258 | 5/1946 | Livers | 91/446 X |
| 2,680,491 | 6/1954 | Davidson | 91/447 X |
| 2,722,102 | 11/1955 | Pilch | 91/446 X |
| 2,849,986 | 9/1958 | Klopp | 91/420 |
| 2,890,683 | 6/1959 | Pilch | 91/447 X |
| 3,273,466 | 9/1966 | Balogh et al. | 91/420 |

FOREIGN PATENTS OR APPLICATIONS

| | | | |
|---|---|---|---|
| 73,015 | 4/1944 | Czechoslovakia | 91/446 |

Primary Examiner—Martin P. Schwadron
Assistant Examiner—Irwin C. Cohen
Attorney—James F. Weiler, Jefferson D. Giller, William A. Stout, Paul L. De Verter, II, Dudley R. Dobie, Jr. and Henry W. Hope

[57] ABSTRACT

The present invention is directed to rod eye assemblies for use with hydraulic cylinder assemblies such as on cranes and deals specifically with safety lock valve means in the rod eye assembly. The safety valve means is comprised of a slidably mounted spool within the rod eye assembly which shifts in response to pressure exerted on the spool when hydraulic fluid is pumped to the cylinder. This shift allows the fluid to flow to and from the cylinder for the operation thereof. Absent such incoming pressure, however, spring means are employed to center the spool, blocking flow from the cylinder.

9 Claims, 4 Drawing Figures

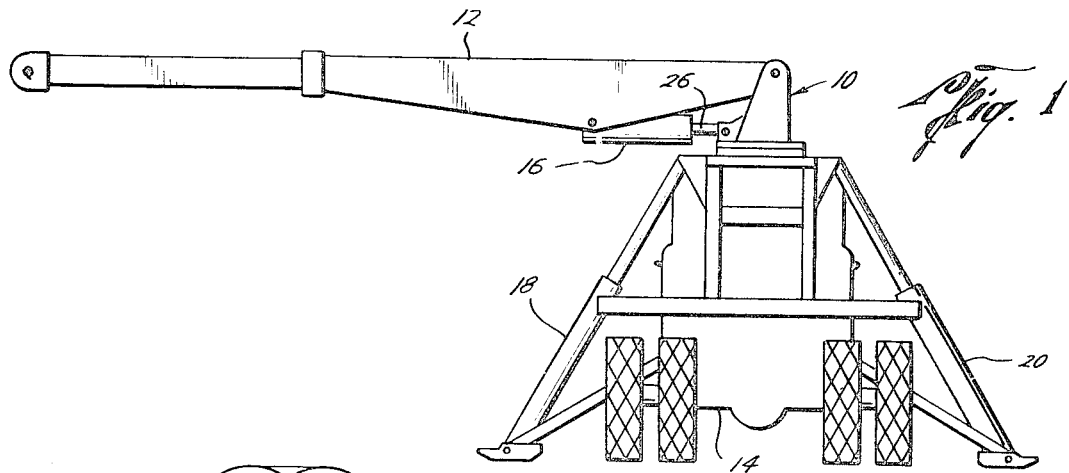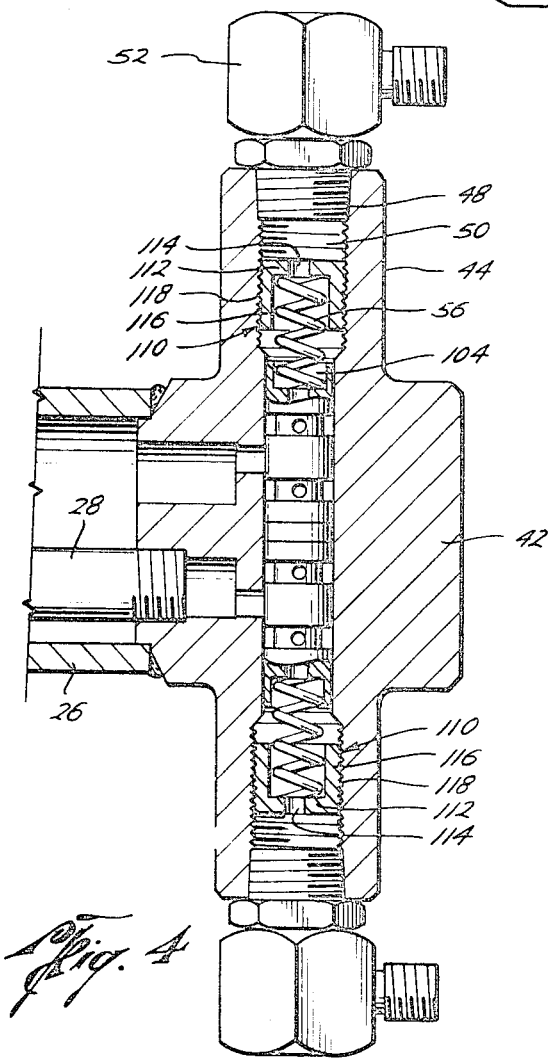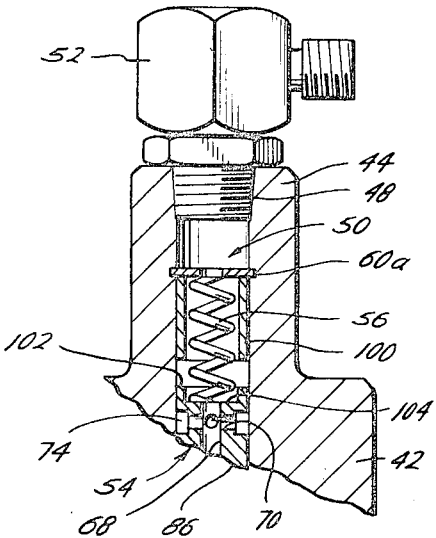

HYDRAULIC LOCK ROD EYE ASSEMBLY

BACKGROUND OF THE INVENTION

It is generally well known to provide a hydraulic crane which has double-acting hydraulic piston and cylinder units (hereinafter sometimes called "hydraulic units" or "units") for actuation of either the crane boom or the outriggers used to provide lateral support for the crane, with rod eye assemblies at one end of each of the hydraulic units. It is through this rod eye assembly that the hydraulic fluid is passed for actuating the units. Prior art devices, however, were generally complicated, requiring extensive and expensive machining and requiring a multiplicity of seals for sealing off the hydraulic flow lines which must pass through the rotatable assembly. As can be well understood, due to the fact that the connections for supplying the hydraulic fluid must be rotatable in order to allow the piston rod to extend and retract, the arrangement of parts utilized must be somewhat complicated to ensure proper operation and the prevention of leaks in the pressure system.

These devices also generally suffer from the disadvantage of having no integral, self-actuating safety mechanism to prevent undesired or accidental flow of the hydraulic fluid from the piston and cylinder unit. As a result, a sudden and unexpected loss of pressure could result in the extended crane boom collapsing with possible injury to personnel and equipment. Such sudden and unexpected pressure loss could result from a variety of causes, i.e., a hydraulic line rupturing, the gasoline engine operating the pump running out of gas, etc.

Accordingly, various means and devices were devised to prevent such accidents from occurring. These, however, generally also require complex and sophisticated arrangements of parts, resulting in an even more complicated device, additional expensive machining, as well as more seals, further maintenance, more frequent breakdowns and other disadvantages flowing from the increased complexity.

SUMMARY OF THE PRESENT INVENTION

The present invention overcomes the above disadvantages by utilizing a safety lock valve in the rod eye assembly. The rod eye body is secured to the end of the piston rod externally of cylinder and is provided with first and second ends having a passageway extending between, and communicating with, these ends. First and second ports are located in the passageway and communicate with the two different conduit means in the piston rod for supplying hydraulic fluid to the opposite sides of the piston.

Positioned for sliding movement within the passageway is a spool having a plurality of openings or ports spaced throughout its length. This spool is spring biased into a central or first position, wherein it blocks and seals in a fluid tight manner the previously mentioned first and second ports. In this position, no fluid can flow to or from the cylinder. It is this spring biased, self-centering of the spool which provides the safety feature of the present invention.

Hydraulic lines are rotatably connected to each end of the passageway for the supply of hydraulic fluid to, and the removal of such fluid from, the hydraulic unit. Hydraulic fluid supplied to the rod eye assembly passageway through either of its ends will overcome the spring bias which centers the spool, moving the spool to a second or third position. In these second and third positions, the first and second ports mentioned previously communicate with their respective ends of the rod eye assembly passageway through the previously mentioned series of ports within the spool. Accordingly, the hydraulic fluid which shifted the spool out of its first or centered position will be allowed to flow into the cylinder, while at the same time, hydraulic fluid on the opposite side of the piston will be allowed to flow from the cylinder.

Should this incoming pressure suddenly stop for any reason, the spring bias will act to center the spool, thus sealing the fluid within the hydraulic cylinder. As can be seen, therefore, in the absence of a positive pressure exerted on one side of the spool, the fluid is effectively sealed within the cylinder, thus preventing its escape.

It is, therefore, an object of the present invention to provide an improved rod eye assembly for use on double-acting hydraulic piston and cylinder units.

It is a further object of the present invention to provide a safety valve assembly contained within the rod eye assembly to prevent sudden and unexpected escape of hydraulic fluid from the unit.

Still another object of the present invention is to provide such a rod eye assembly having the aforementioned safety feature and which utilizes a slidable spool which is spring biased into a normally centered and sealing position.

A further object of the present invention is to provide such a rod eye assembly which carries spool means responsive to pressure created by the flow of hydraulic fluid into either side of the rod eye assembly, to open both sides of the piston within the cylinder to the flow of fluid to one side of the piston and from the other side of the piston, yet which will automatically assume a sealing position when the flow of hydraulic fluid into the rod eye assembly is halted.

An additional object of the present invention is to provide such a rod eye assembly having the previously mentioned automatically functioning safety feature, yet which is simple to manufacture and use and which utilizes a minimum number of parts.

Other and further objects, features and advantages will be apparent from the following description of presently preferred embodiments of the invention, given for the purpose of disclosure, when taken in conjunction with the accompanying drawings.

BRIEF DESCRIPTION OF THE DRAWINGS

In the accompanying drawings, like character references designate like parts throughout the several views, which views, are as follows:

FIG. 1 is a rear view of a truck having mounted thereon a hydraulic crane with outriggers extended for lateral support, FIG. 3 is a partial view, in section, of a modification to the present invention, and FIG. 4 is a partial view, in section, of a second modification to the present invention.

BRIEF DESCRIPTION OF THE PREFERRED EMBODIMENTS

Figure 2:
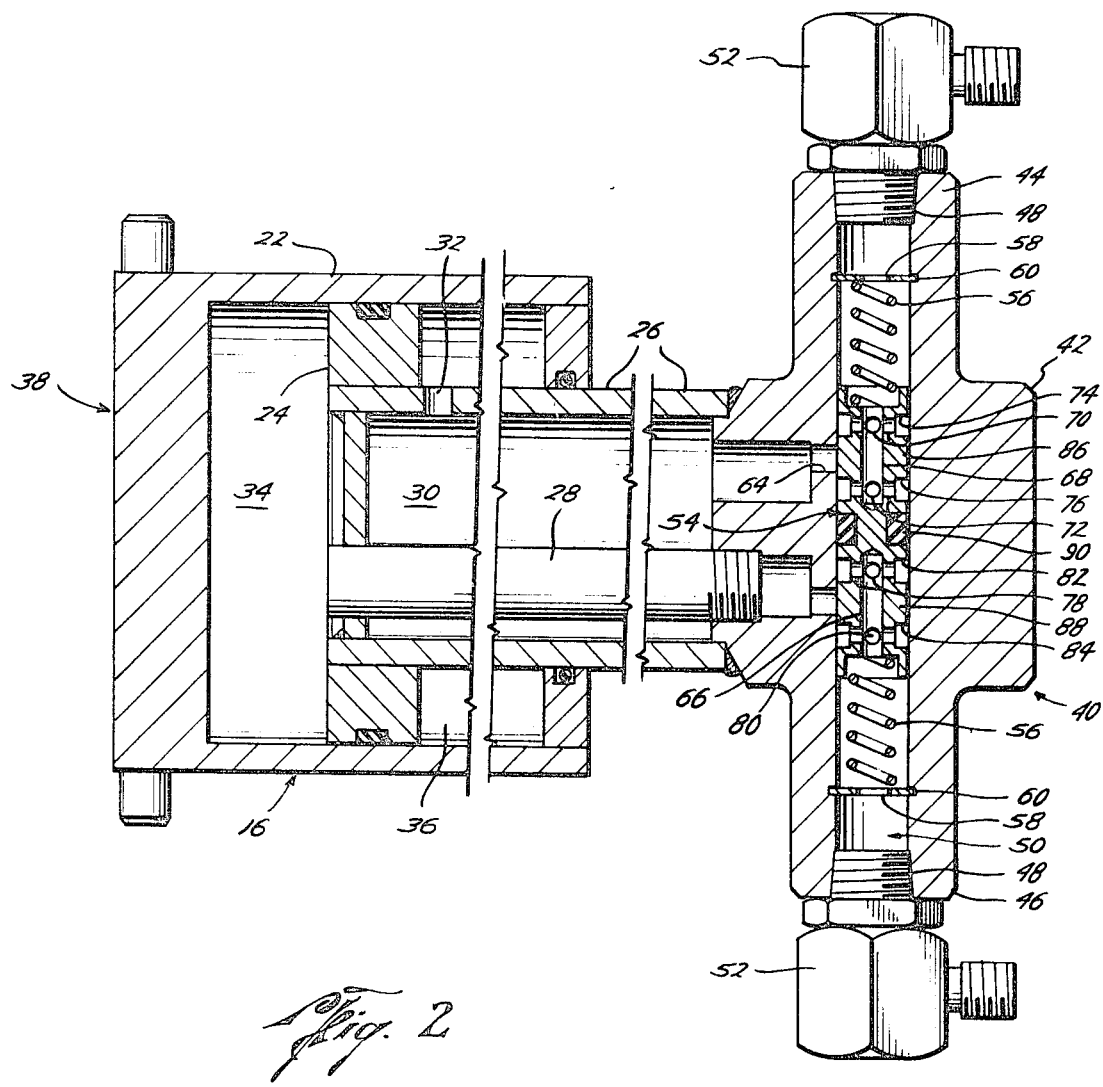
FIG. 2 is a partial view, in section, of the rod eye assembly of the present invention connected to a hydraulic piston and cylinder unit.

To aid in the understanding of the environment within which the present invention is utilized, reference may be had to my copending U.S. Pat. application, Ser. No. 580,270, filed Sept. 19, 1966, and entitled Hydraulic Crane Rod Eye Assembly, now U.S. Pat. No. 3,399,786.

Referring now to the drawings, and particularly to FIG. 1, there is shown a hydraulic crane generally indicated by the reference numeral 10. This particular crane has a boom 12 suitably mounted on a support such as a truck 14. Generally, the crane is hydraulically actuated by the use of a plurality of double-acting piston and cylinder units, such as the unit 16 for raising and lowering the boom 12, and the units 18 and 20 which act as outrigger supports for providing lateral and vertical support to the crane 10. As is conventionally known, the hydraulic units 16, 18 and 20 are pivotally connected at each of their ends to allow rotative movement at the pivot connections when the units are actuated so as to be extended or retracted. Many conventional units utilize external flexible hoses extending to the opposite ends of the cylinder in order to move the piston in both directions. These flexible hoses are, of course, subjected to much wear and tear and to accidental disconnection.

Turning now to FIG. 2, there is shown in simplified form a typical hydraulic cylinder and piston unit. This particular unit is unit 16 of the apparatus shown in FIG. 1, which unit is used to raise and lower the boom 12. The same features and advantages to be discussed are, of course, also applicable to the hydraulic units 18 and 20.

This unit includes an enclosed cylinder 22, a moveable piston 24 slidably contained in the cylinder, a piston rod 26 extending outside of the cylinder, a fluid line 28 within the piston rod which extends through the piston 24 to provide hydraulic fluid to and from one side of the piston 24. The piston rod also contains a hollow interior passageway 30 which communicates with the port 32 to supply fluid to and from the other side of the piston 24. For purposes of convenience and explanation, the two sides of the piston shall be known as the high side 34 and the low side 36, the high side being supplied by the tube 28, and the low side by the port 32. The hydraulic piston and cylinder unit also includes a pivot pin 38 at one end for rotative support of that end of the unit from the crane.

The present invention is directed to the improvement in the rod eye assembly, generally indicated by the numeral 40, attached on the second end of the piston cylinder unit. This allows rotative movement of this second end of the unit while providing means to receive and supply hydraulic fluid to and from the piston cylinder 22.

The rod eye assembly 40 is comprised of a rod eye body 42 secured to the piston rod 26 exterially of the cylinder and rod by any conventional means such as welding. The body 42 includes first and second ends 44 and 46 and a passageway 50 extending between these ends. This passageway has thread means 48 on each of its ends for attachment to a conventional swivel connector such as elements 52 shown in FIG. 2. This swivel connector supplies hydraulic fluid to and from the passageway regardless of the rotation caused by extending or retracting the piston rod. Further explanation as to the connection of the swivel connector and other apparatus to the rod eye assembly is given in my previously mentioned application, Ser. No. 580,270.

Contained within the passageway 50 is a spool member 54. Two springs 56 engage the spool at each of its ends to bias it into a center position which is shown in FIG. 2. These springs are maintained in proper position by means of washers 58, which are keyed into slots 60 in the passageway sidewall. Two ports 62 and 64 exit off the passageway. The first port 62 connects the passageway with the line 28, and the second port 64 connects the passageway with the internal piston rod passage 30 and port 32.

Discussing now in detail the preferred embodiment of the first and second axial passageways 66 and 68, (both of which are shown in broken lines in FIG. 2), these passageways terminate short of connecting with each other. A plurality of radially extending ports 70 and 72 (see also FIG. 3) extend outwardly from the passageway 68 and connect it with the annulus 74 and the annulus 76, respectively. A similar arrangement is provided in the other half or segment of the spool by the ports 78 and 80 connecting the passageway 66 with the annuli 82 and 84, respectively.

Lying between the annuli 74 and 76 is a sealing member or surface 86, and between annuli 82 and 84, a sealing surface 88. A seal 90 separates the spool into first and second segments. These sealing surfaces or members 86, 88 and 90 may be any conventional sliding seal means such as O-rings, machined surfaces, etc. Furthermore, the spool may be comprised of two separate segments divided by the seal member 90, or it may be an integral member.

Turning now to the operation and assuming that one desired to lift the boom, the proper controls on the crane are actuated so that fluid is supplied through the end 46 of the passageway 50. The pressure exerted by the fluid on the spool will force it away from the end 46, overcoming the resistance of the spring 56 on the opposite side of the spool. Movement toward end 44 will continue until the annulus 84 is aligned with the port 62. This will allow the hydraulic fluid to escape into the piston rod, thus relieving the pressure against the spool for further movement. Accordingly, the spool will remain in this position so long as the fluid is pumped into the passageway in the same manner. As will be readily understood, the fluid will pass from the passageway 50 through the port 62 and line 28, into the side 34 of the piston cylinder. This will cause the piston rod to extend, thereby raising the boom.

This movement of the piston will, or course, force fluid out of the side 36 of the cylinder. The previously discussed movement of the spool 54 has aligned the annulus 76 with the port 64. Accordingly, the fluid on the low side 36 of the piston can flow through the port 32, the internal passage 30 of the piston rod 26, the port 64, passageways 72 and into the axially extending passageway 68. From there it will move out through the end 44 of the passageway 50.

Should the pressure causing the shifting of the spool be suddenly cut off or lost, the force maintaining the spool in its shifted position will disappear and the spring bias will return the spool to its centered position of FIG. 2. In this position, the sealing surface 86 blocks the port 64 and the sealing surface 88 blocks the port 60, thus preventing the escape of any additional fluid from the hydraulic unit.

As can be seen, therefore, the valve arrangement of the present invention will automatically assume a centered position, wherein the outlets from the hydraulic piston and cylinder unit will be blocked. This will prevent any movement of the piston and piston rod that is not desired, positive action being required to displace the spool for fluid communication with the ports 62 and 64.

Applications of the safety hydraulic lock rod eye assembly are obvious. Assume, for example, that the crane boom 12 is raised and the pressure is suddenly and unexpectedly lost to the incoming fluid. The safety valve of the present invention will prevent any escape of fluid from the hydraulic unit which would result in a sudden dropping of the crane boom, causing possible injury to equipment and personnel. This invention also has application to such as the outriggers 18 and 20. They are quite essential in providing lateral support, especially when the crane boom is positioned as shown in FIG. 1. Should hydraulic fluid start to exit from the high side of the outrigger 18 when positioned as in FIG. 1, lateral support provided by the outrigger will be lost and the truck is very likely to tip over. Furthermore, the outriggers 18 and 20 are often raised and retracted against the sides of the truck so that they will not interfere with movement of the truck. Should fluid exit from the side 36 of the cylinder, these outriggers will begin to extend into their stabilizing position shown in FIG. 1. Should this happen while the truck is in motion, a serious accident, injury or damage could result.

When it is desired to lower the boom, fluid is pumped into the side 44 of the passageway 50 and this displaces the spool toward side 46. This displacement results in the alignment of the annulus 74 with the port 64, and the annulus 82 with the port 62. Accordingly, the fluid can flow into the low side 36 of the piston 24. This will, in turn, force hydraulic fluid from the high side of the cylinder. This fluid being forced from the cylinder will exit through the port 62 and the annulus 82 in a manner well understood from the previous discussion of the operation of this invention.

Turning now to FIG. 3, a partial view of a modification of the rod eye assembly is shown in section. In this embodiment, the arrangement of the plurality of openings 70 is more clearly shown due to the cutaway section of the spool 54.

This modification differs from the last discussed embodiment in that the lock ring 60a has a cylindrical extension 100. The spring 56 is of a smaller diameter than in the first discussed embodiment due to the fact that is is received within the cylindrical member 100. The end 102 of the spool has a recess 104 which is the same diameter as the inside diameter of the cylindrical member 100, and the spring 56 is also received within this cylindrical recess.

The dimensions for the location of the annuli 74 and 76 with respect to the port 64 must be rather exact to insure a proper mating of the proper annulus with the port upon shifting of the spool. The same is, of course, also true with regard to the annuli 82 and 84 and the port 62. In addition, the annulus 82 must be positioned from the annulus 74 by the same distance as separates the ports 62 and 64, as is also true with the annuli 76 and 84.

The distance that the spool requires to move in order to align with a port and annulus adjacent thereto is the distance that separates the end 102 of the spool from the end of the cylindrical member 100. Accordingly, the cylindrical member acts as a stop for the spool 54 to ensure proper positioning of the spool relative to the ports. A similar arrangement is also employed on the opposite side of the spool.

By use of the embodiment of FIG. 3, the spool is allowed to shift only the correct amount necessary for alignment of the ports and annuli, and there is no uncertainty or delay in the positioning of the spool. This also prevents unnecessary movement of the springs which would result in more rapid wear on them.

FIG. 4 discloses still another embodiment of the structure shown in FIG. 3 and is actually the preferred embodiment as to this insert and stop means. This embodiment uses an insert 110 having an end wall 112 with a hexagon-shaped opening 114 therein. This insert 110 utilizes a cylindrical sleeve 116 which is comparable to the cylindrical extension 100 on the last discussed embodiment, and its internal bore is again the same diameter as that of the recess 104. Finally, the outside peripheral surface 118 of the insert is threaded for engagement with the threaded portion 48 on the end 44.

This insert 110 functions in the same manner as does the modification of FIG. 3 in positioning the spool as it shifts. It also provides the additional advantage, however, of being adjustable due to its threaded connection. Thus, the operator can utilize an Allen wrench with the opening 114 to properly position the insert whereby accurate alignment of the ports can be more easily achieved. As an incidental advantage to this, the precise machining required for the cylindrical member 100 would not be necessary here due to the adjustable nature of the structure. To accomplish this, of course, the threaded portion 48 will have to be extended as is shown in FIG. 4. Other changes and modifications come readily to mind. For example, it would be possible to shorten the spool by elimination of everything from the outermost annuli 74 and 84 to the ends of the spool, leaving only the portion extending between the sealing surfaces, 86 and 88.

As can be seen, therefore, the present invention achieves the objectives set forth at the outset. A rod eye assembly has been devised which ensures proper flow to and from the actuating piston and cylinder unit, yet which ensures against any accidental or unexpected release of fluid from the unit. Means have been disclosed which are contained within the rod eye assembly itself to automatically assume a sealing position upon release of fluid pressure flowing into the rod eye assembly. Furthermore, this safety device is quite simple to manufacture, assemble and use, and requires little maintenance. Due to its simplicity, there is little likelihood of breakdown or possible malfunction.

The present invention, therefore, is well adapted to carry out the objects and obtain the ends and advantages mentioned, as well as others inherent therein. While presently preferred embodiments of the invention have been given for the purpose of disclosure, numerous changes in the details of construction, the combination, shape, size and arrangement of parts may be resorted to without departing from the spirit and scope of the invention.

What is claimed is:

1. A piston rod eye assembly in combination with a double-acting hydraulic piston and cylinder unit having a piston rod in which unit hydraulic fluid is supplied to both sides of the piston through the piston rod and is supplied to the piston rod through the rod eye assembly, and being comprised of,
a piston rod eye body having first and second ends,
a rotatable connection on each of said first and second ends through which the hydraulic fluid is supplied to the rod eye assembly,
a passageway extending between, and terminating in first and second openings at said first and second ends, respectively, each of the first and second openings being in fluid communication with the rotatable connection at its respective rod eye body end, and
first and second ports in said passageway for fluid communication with the piston rod,
a single spool valve means for placing the first and second ports in communication with said first and second passageway openings, respectively, in response to fluid pressure exerted through either of said openings, and
spring means biasing said spool valve means into a first, centered position for closing said first and second ports from communication with said openings in the absence of said fluid pressure.

2. The invention of claim 1 wherein the spool valve means is further defined as including,
a spool having first and second segments slidably mounted in said passageway,
third and fourth ports in the first segment for communicating with the first passageway opening, and
fifth and sixth ports in the second segment for communicating with the second passageway opening, said third and fourth ports being located on opposite sides of the first port when the spool is in its first position, and the fifth and sixth ports being located on opposite sides of the second port when the spool is in its first position.

3. The invention of claim 2 and including sliding seal members on said spool between each of said first and second spool segments, the third and fourth ports and the fifth and sixth ports, each of the seal members forming a sliding seal between the passageway and the spool.

4. The invention of claim 3 wherein the seal members between the third and fourth ports and the fifth and sixth ports are positioned against and seal the first and second ports, respectively, when the spool is in its first position.

5. The invention of claim 2 wherein,
the third and fourth ports are each spaced a predetermined distance from the first port when the spool is in its first position,
the fifth and sixth ports are each spaced said predetermined distance from the second port when the spool is in its first position,
said spool responding to fluid pressure exerted through one of said openings by being forced away from said one opening by the fluid pressure and including,
stop means positioned in the passageway on both sides of the spool said predetermined distance from the spool, whereby the spool can slide only said predetermined distance in either direction.

6. The invention of claim 5 wherein said stop means is further defined as being adjustably positioned on both sides of the spool.

7. The invention of claim 5 wherein said stop means is threadedly engaged with said passageway, whereby its position may be adjusted relative to each side of the spool.

8. The invention of claim 1 wherein said piston rod is further defined as including,
first conduit means contained the in and connected to the first port for conveying hydraulic fluid to and from one side of the piston, and
second conduit means contained in the piston rod connected to the second port for conveying hydraulic fluid to and from the other side of the piston.

9. A piston rod eye assembly in combination with double-acting hydraulic piston and cylinder unit having a piston rod in which unit the actuating hydraulic fluid is supplied to both sides of the piston through the rod eye assembly and being comprised of,
a piston rod eye body having first and second ends,
a rotatable connection on each of said first and second ends through which the hydraulic fluid is supplied to the rod eye assembly,
a passageway extending between said ends, and having first and second openings at said first and second ends, respectively, each of the first and second openings being in fluid communication with the rotatable connection at its respective rod eye body end,
first and second ports in said passageway for communication with said cylinder unit for the actuation of said unit,
a single spool valve slidably mounted in said passageway and having first and second segments, third and fourth ports in said first segment for communicating through said first segment with the first passageway opening, fifth and sixth ports in said second segment for communicating through the second segment with the second passageway opening, a first seal on the spool valve between said third and fourth ports, a second seal on the spool valve between said fifth and sixth ports, a third seal on the spool valve between the first and second segments of the spool valve all of said seals forming a sliding seal between the spool valve and the passageway, a spring bearing against each of said spool segments to maintain said spool valve in a first position, the first and second ports being sealed by the first and second seal means, respectively, when in this first position, the spool valve being slidable to at least second and third positions in response to fluid pressure exerted in the spool valve through one end of said passageway, the first port being in fluid communication with one of said third and fourth ports when the spool valve is in its second position, and with the other of said third and fourth ports when the spool valve is in its third position, and the second port being in fluid communication with one of said fifth and sixth ports when the spool valve is in its second position and with the other of said fifth and sixth ports when the spool valve is in its third position.

\* \* \* \* \*